(12) United States Patent
Wu et al.

(10) Patent No.: US 7,916,215 B2
(45) Date of Patent: Mar. 29, 2011

(54) DETECTION SYSTEM AND METHOD FOR DETECTING RECEIVED VIDEO SIGNAL TYPE WITHIN VIDEO DEVICE

(75) Inventors: Chao-Wang Wu, Miao Li County (TW); Jyh-Yu Chuang, Miao Li County (TW)

(73) Assignee: Coretronic Corporation, Chu-Nan (TW)

( * ) Notice: Subject to any disclaimer, the term of this patent is extended or adjusted under 35 U.S.C. 154(b) by 1333 days.

(21) Appl. No.: 11/445,214

(22) Filed: Jun. 2, 2006

(65) Prior Publication Data

US 2006/0279658 A1 Dec. 14, 2006

(30) Foreign Application Priority Data

Jun. 10, 2005 (TW) .............................. 94119355 A

(51) Int. Cl.
*H04N 5/46* (2006.01)
(52) U.S. Cl. ........................................ 348/558; 348/555

(58) Field of Classification Search .................. 348/554, 348/555, 558, 500, 705, 706; H04N 3/27, H04N 5/46
See application file for complete search history.

(56) References Cited

U.S. PATENT DOCUMENTS

| 7,224,402 | B2 * | 5/2007 | Cho .............................. 348/558 |
| 7,236,209 | B2 * | 6/2007 | Martin .......................... 348/554 |
| 7,636,126 | B2 * | 12/2009 | Mallinson ..................... 348/515 |

* cited by examiner

*Primary Examiner* — Sherrie Hsia
(74) *Attorney, Agent, or Firm* — Birch, Stewart, Kolasch & Birch, LLP

(57) ABSTRACT

A detection system and method for detecting received video signal type within a video device. The video device comprises a plurality of signal receivers; the signal receiver is used for receiving a signal, wherein each of the signal receivers receives one type of the corresponding video signal. First, the video device receives the signal, wherein the receivers receives a signal, directly detects one of the signal receivers which is carrying the video signal, and determines the type of the video signal being inputted to the signal receiver; and finally sending the video signal to an image processor for image processing.

14 Claims, 5 Drawing Sheets

F I G. 1 (Prior Art Technology)

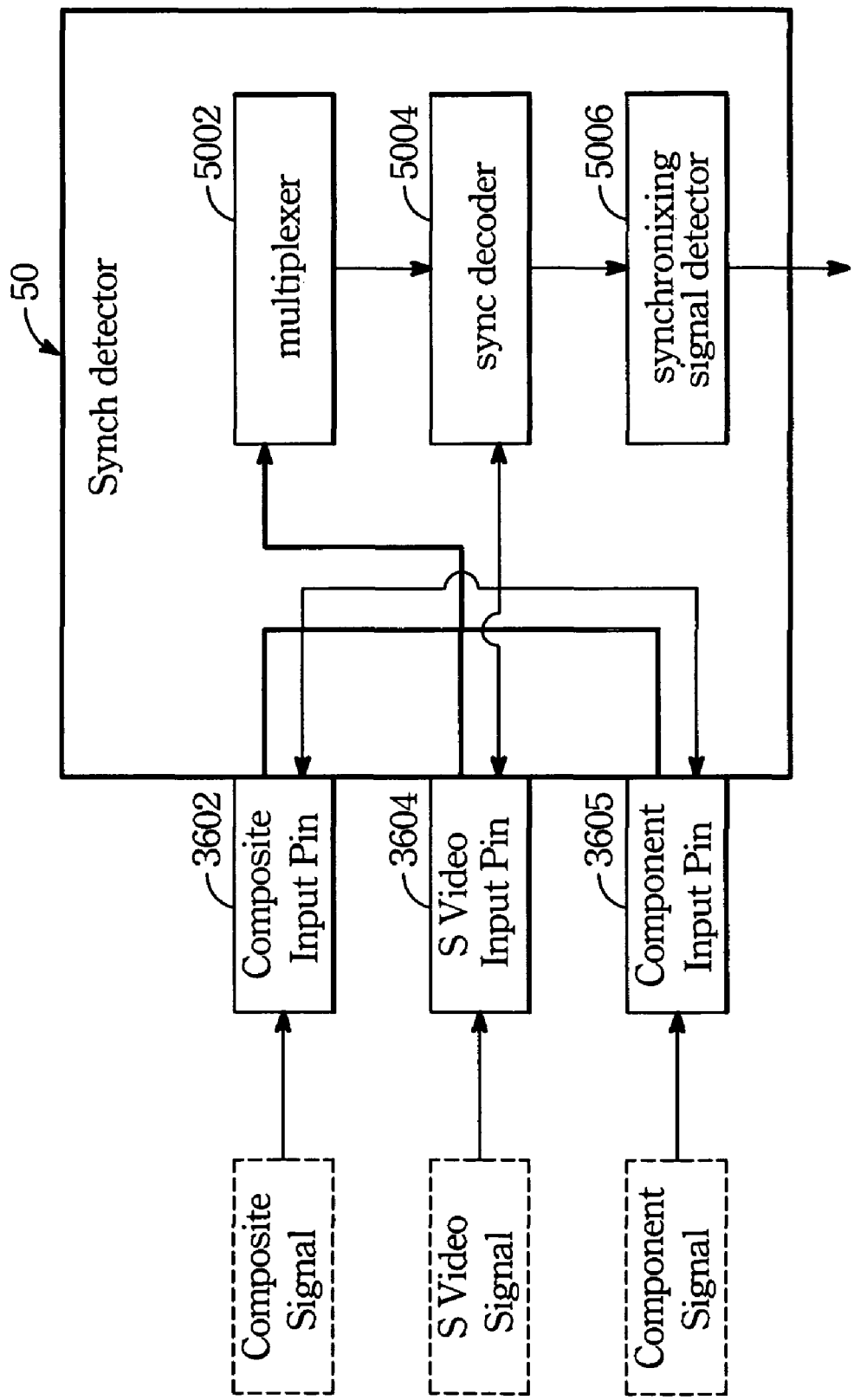
F I G. 3

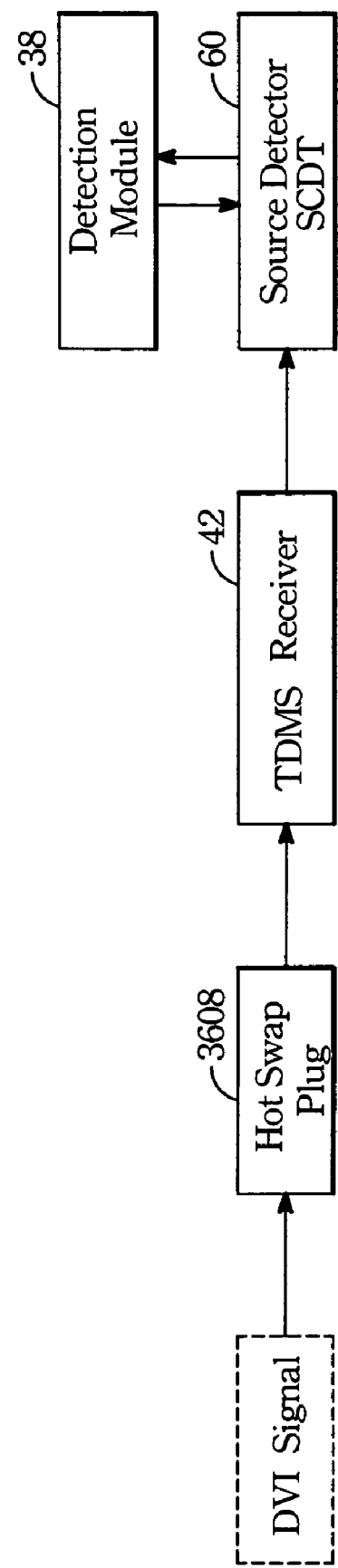
F I G. 4

DETECTION SYSTEM AND METHOD FOR DETECTING RECEIVED VIDEO SIGNAL TYPE WITHIN VIDEO DEVICE

BACKGROUND OF THE INVENTION (1) Field of the Invention

This present invention pertains to a video signal detection system and detection method and in particular to a detection system and detection method for detecting received video signal type within video device.

(2) Description of the Prior Art

Currently, all video devices such as televisions, projectors, monitors, etc, mostly support several video signal types, for example, composite signal, s video signal, component signal, analog RGB signal, and DVI signal, etc. The video device provides automatic video signal searching function, to determine received video signal type for following appropriate displaying of the received video signal.

Please refer to FIG. 1. FIG. 1 shows a detection system according to a conventional detection system. A video device 2 comprises a detection system 4 capable of detecting received video signal type. The detection system 4 comprises a plurality of signal receivers (input pins and hot swap plugs) 6a, 6b, 6c, 8a and 10a correspondingly for video signals with different types, such as composite signal, s video signal, component signal, analog RGB signal, and DVI signal. Typically, video signal can further include a synchronizing signal and a data signal.

Composite input pin 6a, s video input pin 6b and component input pin 6c, which are individually corresponding to composite signal, s video signal, and component signal, are all disposed in the front end of a video decoder 6. Using a switch 602 located in the video decoder 6 is able to sequentially switch these signals (composite signal, s video signal, and component signal).

The video decoder 6 further includes an analog/digital converter 604 and a MCU 606. Analog/digital converter 604 converts the received signal from input pin 6a, 6b, and 6c to digital signal, then proceeding initial signal processing by the MCU 606 for later on signal sending to video decoder 6.

Moreover, the analog RGB signal is received through the hot swap plug 8a located in front end of an analog/digital converter 8, and converted to digital signal by the analog/digital converter 8, and then transmitted out of the analog/digital converter 8.

The DVI signal is received by a hot swap plug 10a located in front end of a TDMS receiver 10, and then transmitted out of the TDMS receiver 10.

The digital signals being transmitted out from video decoder 6, analog/digital converter 8 or TDMS receiver 10, are later sent to an image processor 12 for image processing. By that, the corresponding image of the video signal is thus able to be displayed.

In the conventional system and method for determining received video signal type, a detection module 14, which is usually a firmware, is further disposed to the rear end of image processor 12. Through interpreting the synchronizing signal in video signal, the types of video signal received can be identified by the detection module 14, which is helpful for following image processing by image processor 12.

As described above, the interpretation procedure of the rear end firmware format the detection module 14 of image processor 12 is going over following steps. First, from composite input pin 6a going through the video decoder 6, and later to the image processor 12, and through the route of the detection module 14 is for determining whether comprising the corresponding synchronizing signal. Then, from the s video input pin 6b going through the video decoder 6, and later to the image processor 12, and through the route of the detection module 14 is for determining whether comprising the corresponding synchronizing signal. And then, from the component input pin 6c going through the video decoder 6, and later to the image processor 12, and through the route of the detection module 14 is for determining whether comprising the corresponding synchronizing signal.

And later on, from the hot swap plug 8a going through the analog/digital converter 8, and later to the image processor 12, and through the route of the detection module 14 is for determining whether comprising the corresponding synchronizing signal. And then, from the hot swap plug 10a going through the TDMS receiver 10, and later to the image processor 12, and through the route of the detection module 14 is for determining whether comprising the corresponding synchronizing signal. The steps of the interpretation procedure described above are so complicated. If the detection of synchronizing signal is at the final step, it usually takes more than 10 seconds. A user could run out of their patient and doubt the product quality of the display device 2.

Therefore, an objective of the present invention is to provide a detection system and method for detecting received video signal type within video device for solving the problem described above.

SUMMARY OF THE INVENTION

The present invention is a detection system and method for detecting a received video signal of a video device, wherein the detection system is capable of performing swift detection and identification to various types of the received video signal, and sending the identified signal to an image processor for image processing.

The present invention is about a detection system and method for detecting the received video signal type within the video device. The video device comprises a plurality of signal receivers. The signal receiver is used for receiving a signal, wherein each of the signal receivers handles one type of the corresponding video signal.

The video device first receives the signal through one of the signal receivers. Once a signal is received, the detection system is directly detecting which receiver is carrying video signal, and determining the type of video signal being inputted to the signal receiver; and finally sending the video signal to an image processor for image processing.

Wherein, the video signal further comprises a synchronizing signal and a data signal. The signal receiver can be an input pin or a hot swap plug. A composite input pin, an s video input pin, and a component input pin which are individually corresponding to a composite signal, an s video signal, and a component signal. And the hot swap plug is used as input for analog RGB signal and a DVI signal, wherein the hot swap plugs are respectively located in front end of the analog/digital converter and in the front end of the TDMS receiver.

The above described input pins are linking to external for passing through the signal. The input pins are located in front end of a sync detector. The sync detector decodes the received signal for identifying the existence of the synchronizing signal, and using the result for confirming the existence of the video signal.

The identification of the hot swap plug signal is based on determining whether the power pin of the hot swap plug comprising a pre-arranged level signal for confirming the existence of video signal which corresponding to DVI signal.

Therefore, the detection system and method of the present invention receives the signal from the plurality of signal receivers, and directly detects and identifying the one signal receiver which is carrying the video signal. And the detection system is able to confirm the type of the video signal from the corresponding signal receiver. Then, it is possible to quickly detect the type of the received video signal from various video signal inputs, and send to the image processor for imagine processing.

These and other objectives of the present invention will no doubt become obvious to those of ordinary skill in the art after reading the following detailed description of the preferred embodiment which is illustrated in the various figures and drawings.

From following detail description with illustrated diagrams, the advantages and spirit of the present invention can be further understood.

BRIEF DESCRIPTION OF THE DRAWINGS

FIG. 3 is an over view diagram of a detection module in one embodiment of the present invention.

FIG. 4 is an over view diagram of DVI detection of the present invention.

DESCRIPTION OF THE PREFERRED EMBODIMENT

Figure 1:
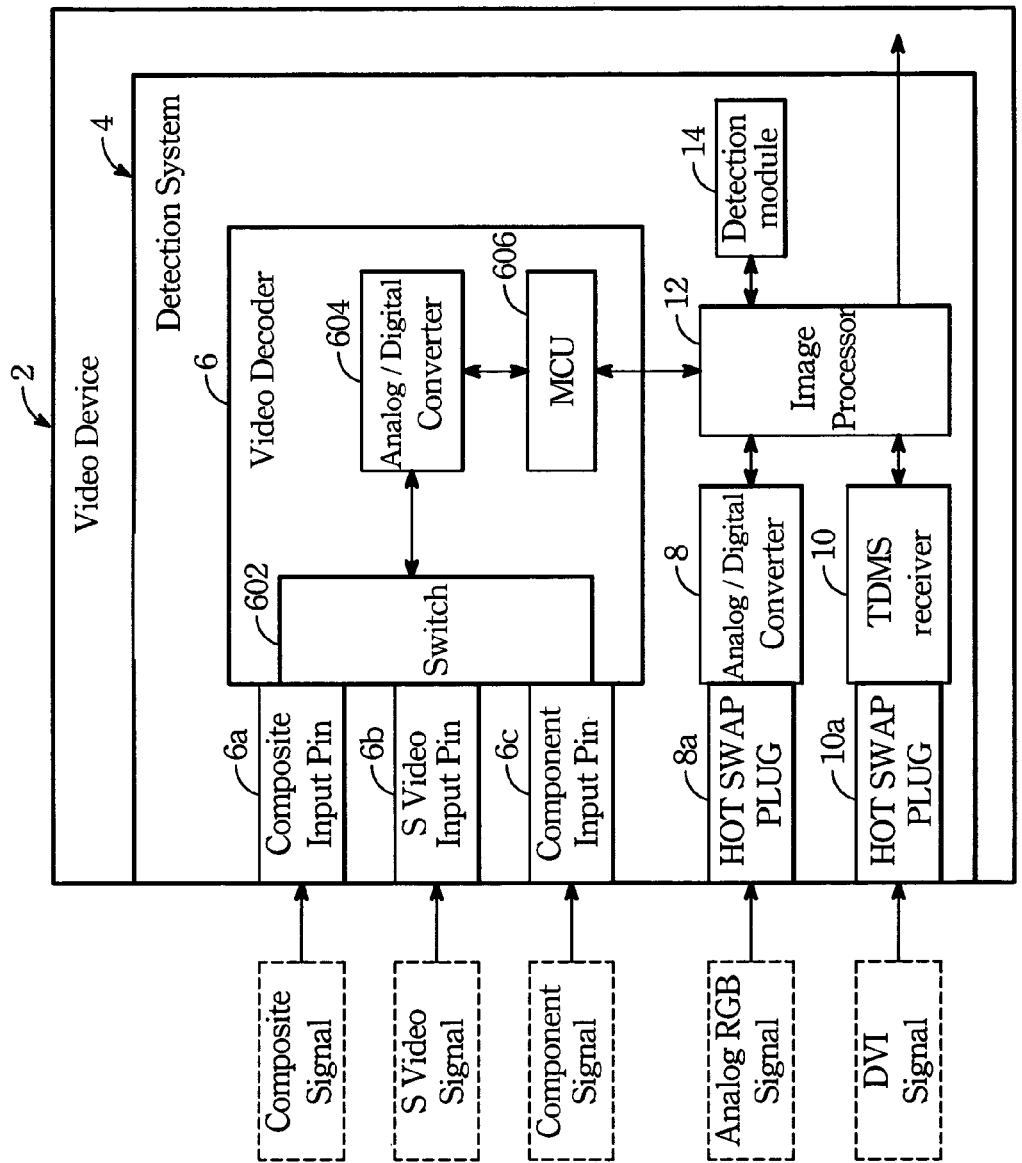
FIG. 1 is an over view diagram of a conventional detection system.
Figure 2:
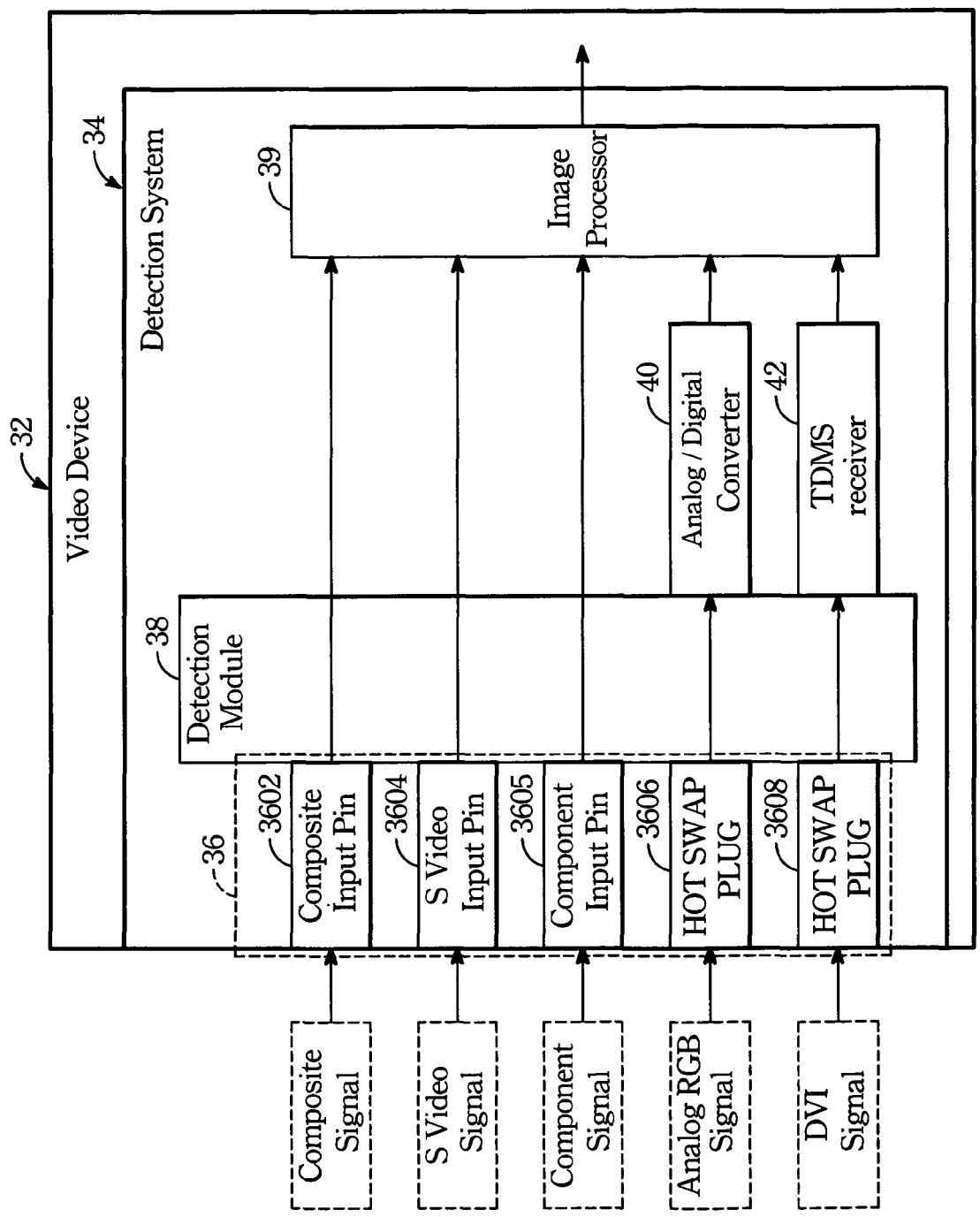
FIG. 2 is an over view diagram of the present invention.

Please Refer to FIG. 2. FIG. 2 is an over view diagram of the present invention. The present invention generally relates to a detection system 34 which is located in a video device 32 for detecting the type of video signal being received. The detection system 34 comprises a plurality of signal receivers 36 and a detection module 38.

A plurality of signal receivers 36 is built within the video device 32. The signal receiver 36 receives external signals for the video device 32. Each signal receiver in the signal receiver 36 receives different corresponding type of signal.

The detection module 38 receives a signal from the signal receiver 36, which comprises a plurality of signal receivers, and directly identifies the signal receiver carrying video signal in signal receiver 36, and also confirms the type of video signal correspondingly.

And after the type of video signal is confirmed by the detection module 38. Then, the signal is sent to an image processor 39 for image processing.

In detail description, the signal receiver 36 comprises a composite input pin 3602, an s video input pin 3604, a component input pin 3605, a hot swap plug 3606, and a hot swap plug 3608.

The input pins 3602, 3604 and 3605, which are individually corresponding to a composite signal, an s video signal, and a component signal, are all disposed in the signal receiver 36. First, the composite signal is passing through the composite input pin 3602 which located in front end of the detection module 38 for inputting to the video device 32. And then, the s video signal is passing through the s video input pin 3604 which located in front end of the detection module 38 for inputting to the video device 32. And then, the component signal is passing through the component input pin 3605 which located in front end of the detection module 38 for inputting to the video device 32.

For an analog RGB signal and a DVI signal, the signal pins of signal receiver 36 are hot swap plugs. The analog RGB signal is passing through a hot swap plug 3606 located in front end of an analog/digital converter 40 for inputting to the video device 32. And then the DVI signal is passing through a hot swap plug 3608 located in front end of a TDMS receiver 42 for inputting to the video device 32.

In further description, for the hot swat plugs 3606, 3608, wherein the detection module 38 detects a pre-arranged level signal in a power pin of each of the hot swap plugs 3606, 3608 for confirming the existence of the video signal. For example, for the analog RGB signal, a ninth pin of the hot swap plug 3606 is the power pin. If the detection module 38 detects a pre-arranged level signal with plus five volts (+5V) in the ninth pin. Then, the detection module 38 confirms the analog RGB signal being received by the video device 32. For another example, for the DVI signal, a fourteenth pin of the hot swap plug 3608 is the power pin. If the detection module 38 detects a pre-arranged level signal with plus five volts (+5V) in the fourteenth pin. Then, the detection module 38 confirms the DVI signal being received by the video device 32.

Please refer to FIG. 3. FIG. 3 is an over view diagram of the detection module in one embodiment of the present invention. The detection module 38 is a sync detector 50 for the composite signal, the s video signal, and the component signal.

The video signal further comprises a synchronizing signal and a data signal. The previously described input pins receive the said video signals from external for the sync detector 50. The input pins are located in front end of the sync detector 50. The sync detector 50 decodes the received signal and detects an existence of the synchronizing signal for confirming the existence of the corresponding video signal.

The sync detector 50 further comprises a multiplexer 5002, a sync decoder 5004, and a synchronizing signal detector 5006.

The multiplexer 5002 is, for example, an integrated circuit like ADG 658 or 74LV4051, which is used for detecting and selecting the pin with the signal. The sync decoder 5004 is an integrated circuit like LM1881 which separates and isolates the received signal. The synchronizing signal detector 5006 is, for example, an integrated circuit like 74LVC123, which determines whether the isolated received signal is the synchronizing signal. And then, determining the corresponding type of the video signal depends on the received synchronizing signal.

In addition, the previously the detection method depends on comparing a synchronizing signal wave pattern with a pre-arranged sample wave pattern for determining whether the received signal is the synchronizing signal. And, if the signal wave pattern matches the pre-arranged sample wave pattern; the received signal is considered the synchronizing signal. When the synchronizing signal of the particular type of the video signal is detected, then the type of the video signal also can be confirmed.

Please refer to FIG. 4. FIG. 4 is an over view diagram of DVI signal detection of the present invention. The DVI signal can further comprise a DVI-A signal in an analog form and a DVI-D signal in a digital form. When the pre-arranged level signal is not detected from the power pin of hot swap plug 3608, then only the confirmation is that the DVI signal does not exist. However, even a pre-arranged level signal is detected from the power pin of hot swap plug 3608; the detected signal still does not provide enough information for confirming whether the signal is the DVI-A signal or the DVI-D signal.

Therefore, after the detection module 38 detects the pre-arranged level signal from the power pin of the hot swap plug 3608; the detection module 38 further detects a digital level signal through a source detector (SCDT) 60 which located in the rear end of the TDMS receiver 42. When the source detector (SCDT) 60 detects a high electrical potential signal, which means only the DVI-D signal has been received. When the source detector (SCDT) 60 detects a low electrical potential signal, which means only the DVI-A signal has been received. Therefore, by using this method, confirming the existence of the DVI-D signal confirms the existence of the video signal corresponding to the DVI signal.

Figure 5:
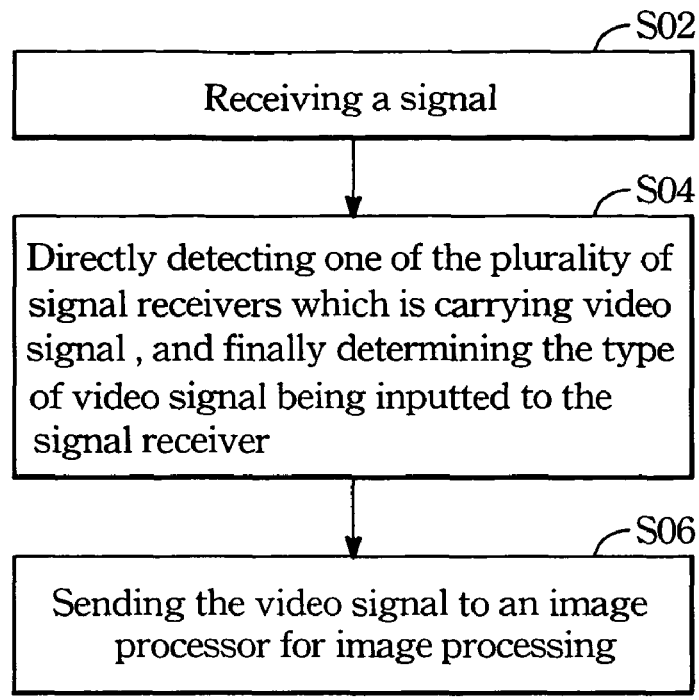
FIG. 5 is a flow chart diagram of a detection method of the present invention.

Please refer to FIG. 5. FIG. 5 is a flow chart diagram of a detection method of the present invention. The present invention is as previously mentioned, a detection method for detecting received video signal type within video device 32. The video device 32 comprises a plurality of signal receivers 36. The signal receivers 36 are used for receiving signals, and each signal receiver 36 receives one type of the corresponding video signal. The detection method includes the following steps:

Step S02: The video device 32 receiving a signal;

Step S04: a plurality of signal receivers 36 receiving the signal, and then directly detecting one of the signal receivers 36 which is carrying video signal, and finally determining the type of video signal being inputted to the signal receivers 36;

Step S06: Sending the video signal to an image processor 39 for image processing.

The video signal further comprises a synchronizing signal and a data signal. When the video signal is the composite signal, the s video signal or the component signal, then the signal receiver 36 is the input pin which links the external for passing the input signal from the external. The input pin is located in front end of a sync detector 50. The sync detector 50 decodes the received signal for determining the existence of synchronizing signal, and confirming the existence of the video signal.

Figure 6:
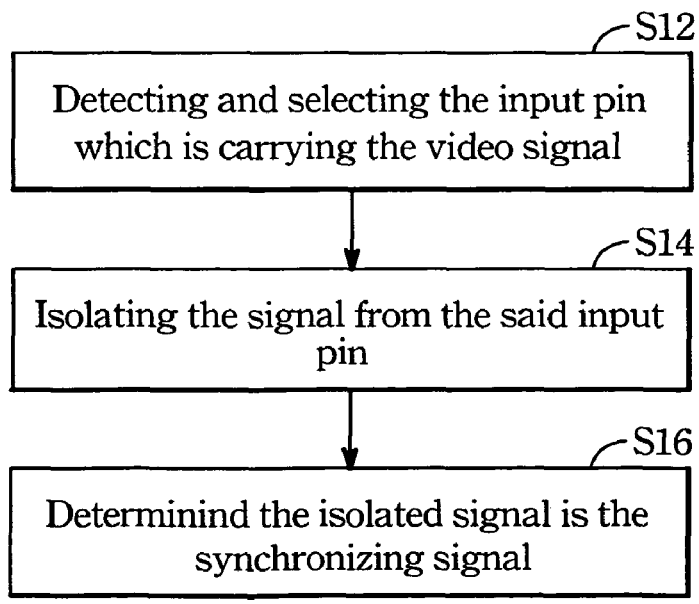
FIG. 6 is a step-by-step process diagram of a detection process in a sync detector of the present invention.

Please refer to FIG. 6. FIG. 6 is a step-by-step process diagram of the detection method in a sync detector of the present invention. Within the sync detector 50 further includes following steps:

Step S12: Detecting and selecting the input pin which is carrying the video signal;

Step S14: Isolating the signal from the input pin

Step S16: Determining the isolated signal being the synchronizing signal, for confirming the existence of corresponding video type.

On the other hand, if the video signal is the analog RGB signal or the DVI signal, and then the signal receiver 36 are hot swap plugs 3606, 3608. The detection method is based on determining the pre-arranged level signal in the power pin of the hot swap plug 3606 or 3608, and the existence of video signal can be identified and confirmed.

Therefore, the present invention uses the detection method and the detection system 34 which is built within the video device 32 for determining received video type. From a plurality of signal receivers 36, one of the signal receivers 36 receives a signal and directly detects one of the signal receivers 36 which is carrying video signal, then determining corresponding type of the video signal. Through this method, swift detection and identification from various possible received video signals can be achieved and then sending the identified signal to the image processor 39 for image processing.

With the example and explanations above, the features and spirits of the invention are hopefully well described. Those skilled in the art will readily observe that numerous modifications and alterations of the device may be made while retaining the teaching of the invention. Accordingly, the above disclosure should be construed as limited only by the metes and bounds of the appended claims.

We claims:

1. A detection method for detecting received a video signal type within a video device, wherein the video device comprises a plurality of signal receivers and an image processor, wherein each the signal receiver receives one type of the corresponding video signal, the video signal comprising a synchronizing signal and a data signal, and the signal receiver is an input pin linking external for passing the signal, and each the signal receiver is located in front end of a sync detector, wherein the sync detector decodes the received signal for identifying the existence of the synchronizing signal, and confirming the existence of the video signal, and the detection method including following steps:

receiving the signal;

detecting one of the signal receivers carrying video signal, and determining the type of video signal being inputted to the signal receiver; and sending the video signal to the image processor for image processing.

2. The detection method of claim 1, wherein the detection method of the sync detector further includes following steps:

detecting and selecting the input pin comprising a signal;

isolating the signal from the input pin; and determining the isolated signal being the synchronizing signal.

3. The detection method of claim 2, wherein the video signal is chosen from a video signal group comprising of a composite signal, a s video signal, and a component signal, wherein the composite signal is going through the composite input pin located in front end of the sync detector for inputting to video device; and the s video signal is going through the s video input pin located in front end of the sync detector for inputting to video device; and the component signal is going through the component input pin located in front end of the sync detector for inputting to the video device.

4. The detection method of claim 1, wherein identifying and confirming a signal is a synchronizing signal depending on comparing a synchronizing signal wave pattern with a pre-arranged sample wave pattern, if the signal wave pattern matching the sample wave pattern, and then the signal is considered a synchronizing signal.

5. The detection method of claim 1, wherein the detection method further includes following steps:

detecting a pre-arranged level signal from a power pin of the hot swap plug for confirming the existence of the video signal by a detection module, wherein the signal receiver is a hot swap plug.

6. The detection method of claim 5, wherein the detection method further includes following steps:

choosing the video signal from a video signal group comprising an analog RGB signal, and a DVI signal;

inputting the analog RGB signal through the hot swap plug located in front end of an analog/digital converter to the video device; and inputting the DVI signal through the hot swap plug located in front end of a TDMS receiver to the video device.

7. The detection method of claim 6, wherein after detecting the pre-arranged level signal from the power pin of the hot swap plug to detect DVI signal, and further includes following steps:
- performing further detecting a digital level signal for confirming the existence of the video signal corresponding to the DVI signal through a source detector (SCDT).

8. A detection system for detecting a received video signal type within a video device, the detection system including:
- a plurality of signal receivers, wherein each signal receiver is built within the video device and used for receiving a signal, wherein each the signal receiver is responsible for receiving the corresponding type of the video signal; and
- a detection module, directly detecting the signal receiver carrying the video signal from one of the signal receivers and determining the corresponding video signal, wherein the video signal is sent to an image processor of the video device for image processing, wherein the detection module is a sync detector, the signal receiver is an input pin, and the video signal comprises a synchronizing signal and a data signal wherein the input pin connects external for passing through the signal and located in front end of the sync detector, wherein the sync detector decodes the received signal for identifying the existence of the synchronizing signal, and confirming the existence of the video signal.

9. The detection system of claim 8, wherein the sync detector further comprises:
- a multiplexer for detecting and choosing the input pin comprising a signal;
- a sync decoder for isolating the signal from the input pin; and
- a synchronizing signal detector for identifying whether the isolated signal is a synchronizing signal.

10. The detection system of claim 9, wherein the video signal is chosen from video signal group comprising of a composite signal, a s video signal, and a component signal, wherein the composite signal is going through a composite input pin located in front end of the sync detector for inputting to the video device; and the s video signal is going through an s video input pin located in front end of the sync detector for inputting to the video device; and the component signal is going through a component input pin located in front end of the sync detector for inputting to the video device.

11. The detection system of claim 8, wherein identifying and confirming the signal is the synchronizing signal, depending on comparing a synchronizing signal wave pattern with a pre-arranged sample wave pattern, if the signal wave pattern matching the sample wave pattern, and then the signal is considered the synchronizing signal.

12. The detection system of claim 8, wherein the signal receiver is a hot swap plug, the detection module detecting a pre-arranged level signal from the power pin of the hot swap plug for confirming the existence of the video signal.

13. The detection system of claim 12, wherein the video signal is chosen from a video signal group comprising an analog RGB signal, and a DVI signal, wherein the analog RGB signal is inputted through a hot swap plug located in front end of an analog/digital converter to the video device, and the DVI signal is inputted through a hot swap plug located in front end of a TDMS receiver to the video device.

14. The detection system of claim 13, wherein for detecting the DVI signal, after the pre-arranged level signal being detected from the power pin of the hot swap plug, wherein the detection module uses a source detector (S CDT) for further decoding a digital level signal and confirming the existence of the video signal corresponding to the DVI signal.

\* \* \* \* \*